(12) United States Patent
McGrade (10) Patent No.: US 9,980,477 B2
(45) Date of Patent: May 29, 2018

(54) VERTICAL TRAP

(71) Applicant: Michael McGrade, West Covina, CA (US)

(72) Inventor: Michael McGrade, West Covina, CA (US)

(*) Notice: Subject to any disclaimer, the term of this patent is extended or adjusted under 35 U.S.C. 154(b) by 114 days.

(21) Appl. No.: 15/333,422

(22) Filed: Oct. 25, 2016

(65) Prior Publication Data

US 2018/0110214 A1    Apr. 26, 2018

(51) Int. Cl.
*A01M 23/24*    (2006.01)

(52) U.S. Cl.
CPC .................... *A01M 23/24* (2013.01)

(58) Field of Classification Search
CPC .................................... A01M 23/24
See application file for complete search history.

(56) References Cited

U.S. PATENT DOCUMENTS

| 400,324 | A | * | 3/1889 | Gilmore | A01M 23/24 43/86 |
| 575,792 | A | * | 1/1897 | Sullivan | A01M 23/24 43/85 |
| 600,156 | A | * | 3/1898 | Mast | A01M 23/24 43/85 |
| 1,507,532 | A | * | 9/1924 | Vickers | A01M 23/30 43/81 |
| 1,587,536 | A | * | 6/1926 | Lobit | A01M 23/24 43/61 |
| 1,794,463 | A | * | 3/1931 | Kelp | A01M 23/24 43/81 |
| 1,922,265 | A | * | 8/1933 | Thada | A01M 23/24 43/83 |
| 2,448,618 | A | * | 9/1948 | Patrick | A01M 23/24 43/82 |
| 2,506,055 | A | * | 5/1950 | Benson | A01M 23/24 43/85 |
| 3,488,878 | A | * | 1/1970 | Morodomi | A01M 23/24 43/86 |
| 4,306,370 | A | * | 12/1981 | Lindblad | A01M 23/24 43/82 |
| 4,633,610 | A | * | 1/1987 | Thompson | A01M 23/24 43/61 |
| 5,588,249 | A | * | 12/1996 | Flinner | A01M 23/20 43/61 |
| 5,950,354 | A | * | 9/1999 | Carnwath | A01M 23/30 43/81 |
| 6,101,761 | A | * | 8/2000 | Sprick | A01M 23/265 43/85 |
| 6,990,767 | B1 | * | 1/2006 | Margalit | A01M 23/20 43/61 |
| 2006/0156615 | A1 | * | 7/2006 | Hale | A01M 23/245 43/58 |

(Continued)

*Primary Examiner* — Christopher P Ellis
(74) *Attorney, Agent, or Firm* — Mark S Hubert (57) ABSTRACT

A snap style vermin trap disposed on a planar platform having an enclosed bait chamber and a partially enclosed actuation chamber. The bait chamber and the actuation chamber are separated by a perforated vertical trip plate. A detachable housing resides about the platform. The snap trap mechanical components are housed in the bait chamber. The design prevents the vermin from ever reaching the bait or contaminating the bait chamber. The vertical trip plate disadvantages the vermin physically and the housing further prevents escape.

11 Claims, 5 Drawing Sheets

(56) References Cited

U.S. PATENT DOCUMENTS

| | | | |
|---|---|---|---|
| 2006/0236590 A1* | 10/2006 | Hootman | A01M 23/245 43/92 |
| 2008/0282600 A1* | 11/2008 | Rich | A01M 23/18 43/61 |
| 2013/0263494 A1* | 10/2013 | Kay | A01M 23/24 43/58 |
| 2014/0020278 A1* | 1/2014 | Smith | A01M 23/36 43/79 |

* cited by examiner

VERTICAL TRAP

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to rodent traps, and more particularly to a vertically actuated mole trap.

BACKGROUND

Trapping vermin such as rodents, moles (rats, mice, chipmunks, squirrels, prairie dogs, etc.) are a function that most people will experience at one time in their life. There is a plethora of methods for eradicating these pests such as trapping, shooting and poisoning. Farmers often maintain cats and dogs just to fulfill this purpose. Despite these radically different approaches, there a few common features that all users want to see in their trapping devices. However, not all devices possess all of these features. Generally, users choose traps that have the features most important to them.

The most sought after features are: ease of setting; cleanliness in handling after a use; ease of extraction of the vermin from the device; ease of baiting; reduced need to rebait; low vermin escape probability; low rate of unproductive, inadvertent device tripping; good aesthetics of device with a captured vermin; and extended durability (able to repeatedly withstand the outside elements for long uses.)

It is a long felt need in the industry to provide a single trap that possesses as many of these features as possible. Incorporating more of these features in a single trap will give the consumer a much easier to operate, more efficient, and sanitary trap that is not visually repulsive to one viewing a trapped vermin in the device. Thus, a simpler, cleaner, easier to operate trap with a higher kill efficiency is provided by the embodiment set forth below. This new invention utilizes and combines known and new technologies in a unique and novel configuration to overcome the aforementioned problems and accomplish this.

BRIEF SUMMARY

In accordance with various embodiments, a vertical trap for the eradication of vermin is provided.

In one aspect, a trap that is vertically actuated before the vermin can reach the bait is provided. Further, a trap that has two chambers separated by a vertical trip plate is provided.

In a second aspect, a trap that can place the vermin in a physically disadvantaged position before the actuation, so as to increase the rate of trapping is provided.

In another aspect, a trap that can be sanitarily baited separately from the setting or actuation of the snap trap is provided.

In another aspect, a trap that has a high rate of successful trapping coupled with a low rate of inadvertent actuation is provided.

In yet another aspect, a vermin trap is provided, capable of shielding the view of the trapped vermin from onlookers.

In a final aspect, an economical, easy to produce vermin trap that can be use repeatedly outdoors without deterioration and is easy to set, is provided.

Various modifications and additions can be made to the embodiment discussed without departing from the scope of the invention. For example, while the embodiment described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

While various aspects and features of the preferred embodiment of the vertical trap have been summarized above, the following detailed description illustrates the preferred embodiment in further detail to enable one skilled in the art to make and use such an embodiment. The described embodiments are provided for illustrative purposes and are not intended to limit the scope of the invention.

In the following description, for the purposes of explanation, numerous specific details are set forth in order to provide a thorough understanding of the described embodiment. It will be apparent to one skilled in the art, however, that other embodiments of the present invention may be made and used without some of these specific details. No single feature or features of the embodiments should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "means for actuation" as used herein including the claims, is to be interpreted according to 35 USC 112 [para] 6. It refers to a resettable mechanical mechanism that retains and releases stored mechanical energy into the rapid movement of the snap arm when actuated.

As used herein the term "snap trap" or "snap style trap" refers to a design of trap that utilizes a rapid actuating mechanism, (such as a wire arm) to trap or strike and kill the vermin and retain it there. The rapid actuating mechanism is maintained in a mechanically charged (armed) position by an actuation means powered generally by stored mechanical energy (such as a torsion wound spring) and is actuated by a means for actuation.

As used herein the term "snap mechanism" refers to the operational combination of the snap arm and the means for actuation.

The present invention relates to a novel design for a vertically actuated "snap style" vermin trap. It overcomes the drawbacks and short comings of the prior art snap traps because it offers the following operational and structural improvements: it functions with the triggering of a vertical rather than horizontal trip plate; it provides a barrier between the bait and the vermin therein reducing the need to rebait the trap and maintaining the cleanliness of the bait region; it is vertically actuated which the vermin often does by standing on its rear legs positioning it in a less maneuverable position thereby leaving it less likely to be able to escape the snap arm; it has a two piece detachable housing and base trap for cleaning, it eliminates the vermin from jumping up to avoid the snap arm; it shields the unsightly vision of a dead vermin; it has an easily set snap mechanism that can safely be moved and jostled while in the armed position; its housing reduces the number of inadvertent actuations of the snap mechanism; and it can be rebaited from the rear via an access port while the trap is armed.

Figure 1:
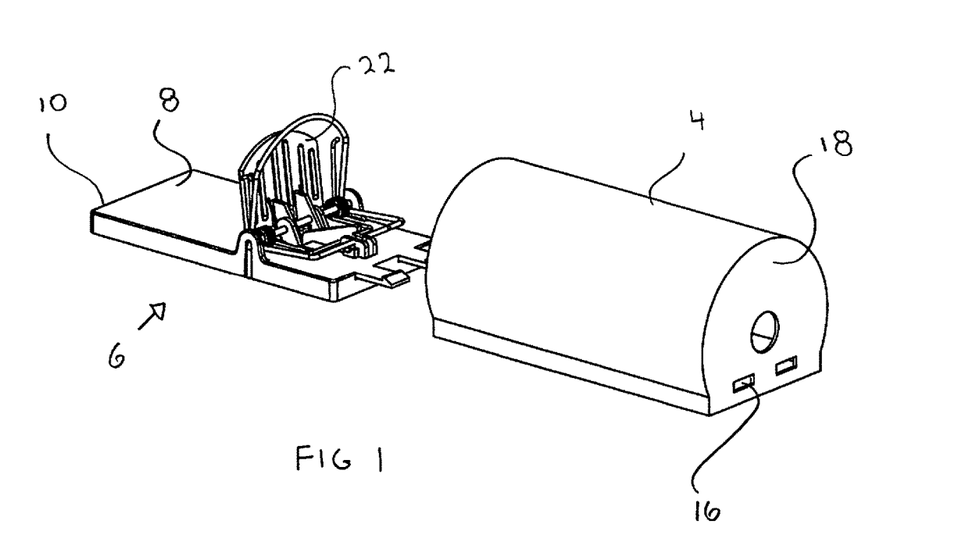
FIG. 1 is a rear perspective view of the vertical trap segregated into its detachable housing and base trap components.
Figure 2:
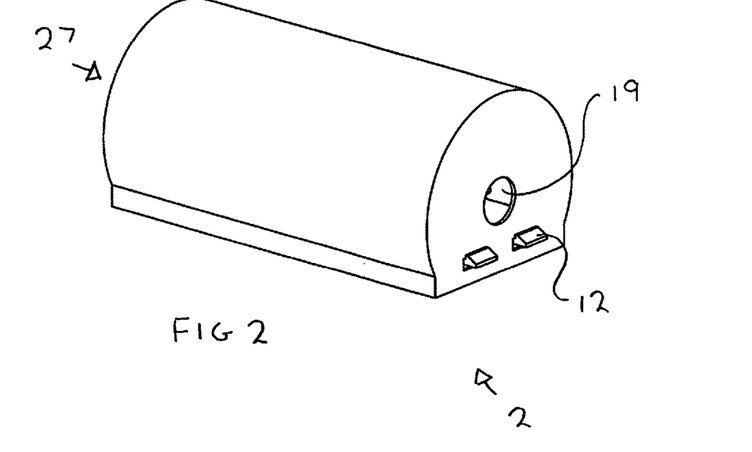
FIG. 2 is a rear perspective view of the assembled vertical trap.

Looking at FIGS. 1 and 2 it can be seen that the vertical trap 2 has a housing 4 and a detachable snap trap 6. These components are momentarily detached and separated for the arming of the means for actuation. The snap trap 6 has all of its mechanical components affixed to the top face 8 of a generally planar trap platform 10. The platform 10 has a set of mechanical tabs 12 extending normally from its rear edge 14 that are mechanically engageable with the set of slots 16 cut through the back face of the housing 4. (Although this is the preferred method of coupling these components, it is well known in the art that this could be accomplished by several equivalent mechanical designs.)

The concept and basic design reflect that the trap 2 is partially enclosed snap trap that is segregated into two chambers residing atop of a trap platform 10 that are separated by a perforated, vertical trip plate 22 having a series of orifices 21 formed therethrough so the vermin can see and smell the bait. (In the preferred embodiment these performations are slots.) The two chambers are the bait chamber 19 (which houses the bait and the snap mechanism) and the actuation chamber 27 (where the vermin enters and is disposed of.) The bait chamber is enclosed on all sides by the trap platform 10, the vertical trip plate 22 and the inner wall of the housing 4. The actuation chamber has an open front end and is otherwise bounded by the trap platform 10, the vertical trip plate 22 and the inner wall of the housing 4. The vertical trip plate 22 initiates the means for actuatuion of the trap 2. This dual chamber, design prevents the vermin from ever reaching and contaminating the bait (thus avoiding the need to rebait the trap). The enclosed bait chamber 19 and semi enclosed actuation chamber 27 design physically positions the vermin for a higher probability of successful eradication, prevents the vermim's sudden escape movement, and shields the goings on from view. It also allows the trap 2 to be picked up without fear of contaminating one's hands.

Figure 8:
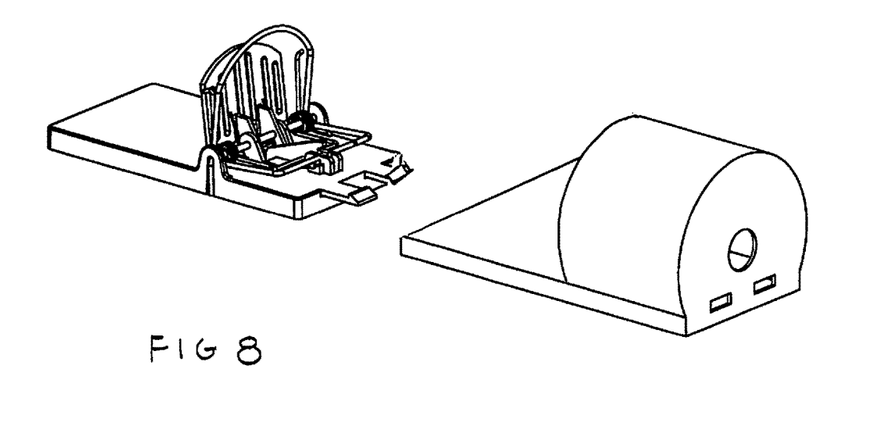
FIG. 8 is a rear perspective view of the alternate embodiment vertical trap segregated into its detachable housing and base snap trap components.
Figure 9:
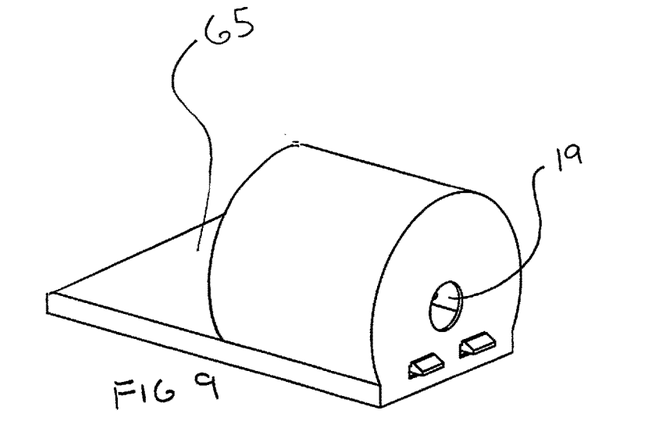
FIG. 9 is a rear perspective view of the assembled alternate embodiment vertical trap.

It is known that the housing 4 need only extend over the portion of the trap 2 that encloses the bait chamber 19. Such an alternate embodiment is illustrated in FIGS. 8 and 9 and will utilize a non-enclosed actuation area 65 rather than the partially enclosed actuation area (chamber) 27 of the preferred embodiment, and will remain functional, but with a reduction in the efficiency of the vermin eradication.

The housing 4 is a hollow cylindrical body open on its front face and having a generally planar rear face 18 residing generally perpendicular to the linear axis of the trap 2. It also has an access port cut through its rear face for both viewing and rebaiting of the trap 2. The geometrical configuration of the round cylindrical body is not that of a right cylinder but rather of a right cylinder that has been truncated alone one side along its linear axis so as to form a flat section of the side that serves as the bottom face 20 of the housing 4. In alternate embodiments, the housing 4 may not have a bottom face 20 leaving but a "C" configuration. It is to be noted that the cylindrical body need not be round as rectangular, hexagonal or other geometric cross sections would suffice.

Figure 3:
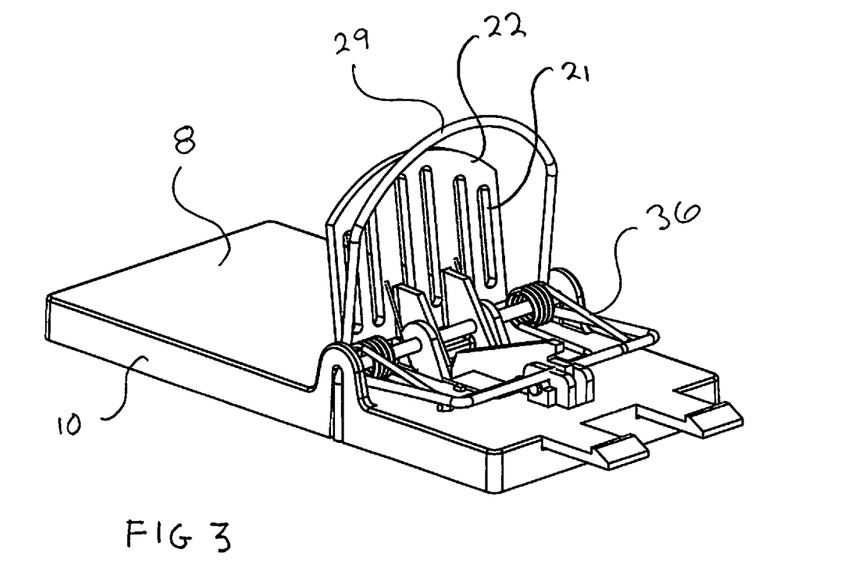
FIG. 3 is a rear perspective view of the armed base snap trap.
Figure 4:
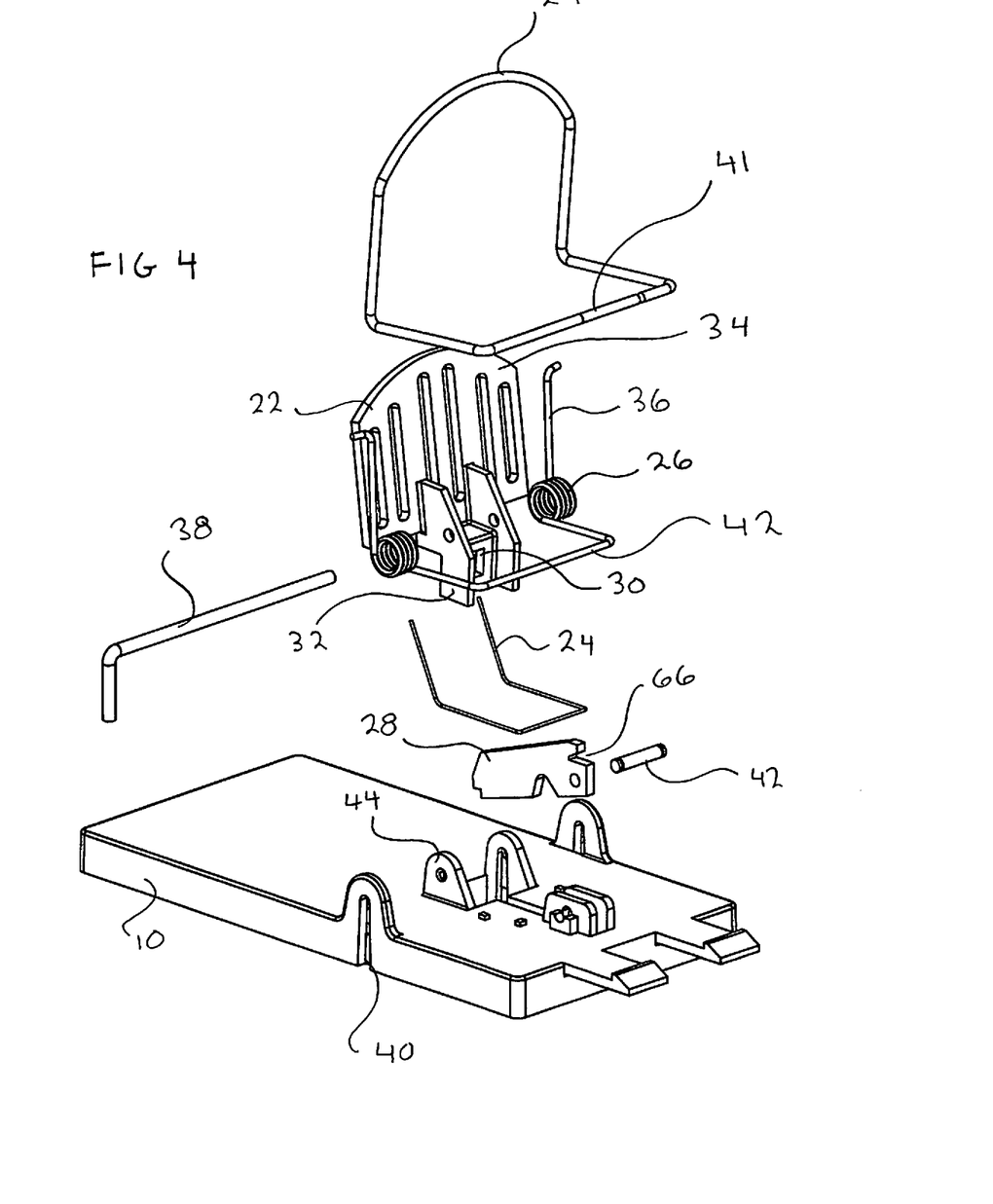
FIG. 4 is an exploded rear perspective view of the base trap.
Figure 5:
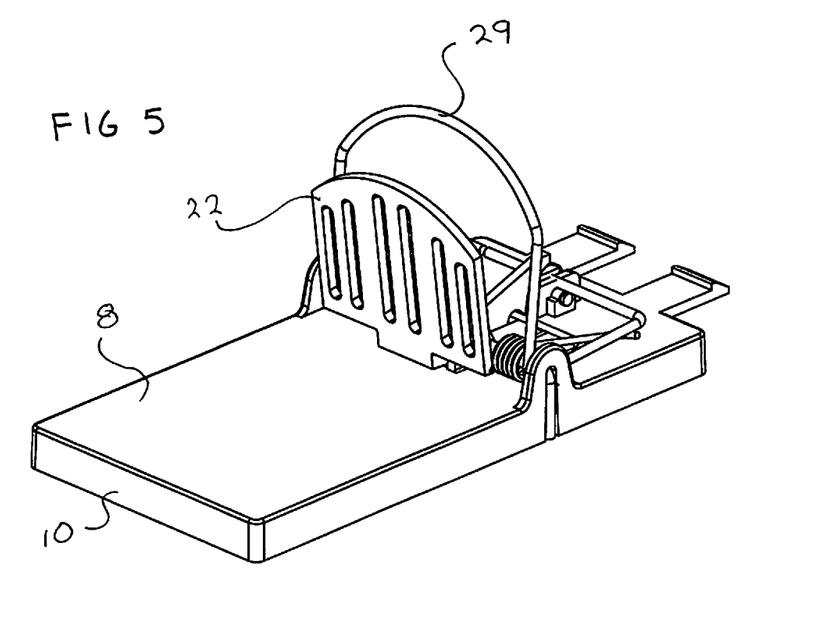
FIG. 5 is a front perspective view of the base snap trap in the armed mode.

Looking at FIGS. 3, 4 and 5 it can be seen that on the trap platform 10 resides the snap mechanism which consists of the vertical trip plate 22 which is operationally connected to the means for actuation and the forward bias device 24. The means for actuation has a stored energy device 26 (a wound torsion spring) operationally connected to a pivotable snap arm 29 that may be propelled at a high rate of speed over the top of its vertical trip plate 22 and into the strike area of the top face 8 of the trap 2. The perforated, vertical trip plate 22 has a trip arm recess 30 formed to extend from its rear face 34, between two parallel support plates 32 that extend normally from this rear face 34. The two support plates 32 have aligned orifices through which passes a support member (rod) 38, that aligns and retains the snap mechanism onto the trap platform 10 via its insertion into a slot 40 on the side of the trap platform 10. The trip plate 22 may tilt toward the rear or the front of the trap 2, pivoting about the linear axis running through the center of the aligned orifices (and the support member 38.) There are two side arms 36 that extend vertically upward from the torsion spring 26 (which is the stored energy device) and that are connected to the snap arm 29. The torsion spring 26 is positioned around the support member 38. (It is to be noted that the stored energy device is in the charged or armed state in FIGS. 1, 3 and 5. It is in the actuated state in FIGS. 6 and 7.) Being "armed" means that the torsion spring 26 has its is bottom arm 42 in contact with the top face 8 of the trap platform 10, its side arms 36 connected to the snap arm 29, and the rear end 41 of the snap arm 29 rigidly locked into the "V" notch 66 in the rear end of the trip arm 28 which is inserted into the trip arm recess 30. In this configuration, the snap arm 29 is under considerable torsional pressure urging it to pivot toward the front of the trap 2. It is held from moving under this pressure by the trip arm 28 which is locked into the trip arm recess 30.

Trip arm 28 has a front and a rear end, with the front end fitting into the trip arm recess 30 of the vertical trip plate 22. Extending normally from both sides of the rear end of the trip arm 28 are ends of a pin 42 that rotationally engage a pair of stanchions 44 that extend normally from the top face 8 of the trap platform 10. This pin 42 allows the pivotal motion of the trip arm 28. The rear end of the trip arm 28 also has a "V" notch 66 formed thereon that is adapted to retain the bottom end 41 of the snap arm 29.

The forward bias device 24 is simply a spring wire mechanism that is affixed to the top face 8 of the trap platform 10 and braced (under forward pressure) against the back face of the trip plate 22 to maintain the trip plate 22 in a forward position. It is used to help in arming the trap 2.

Figure 6:
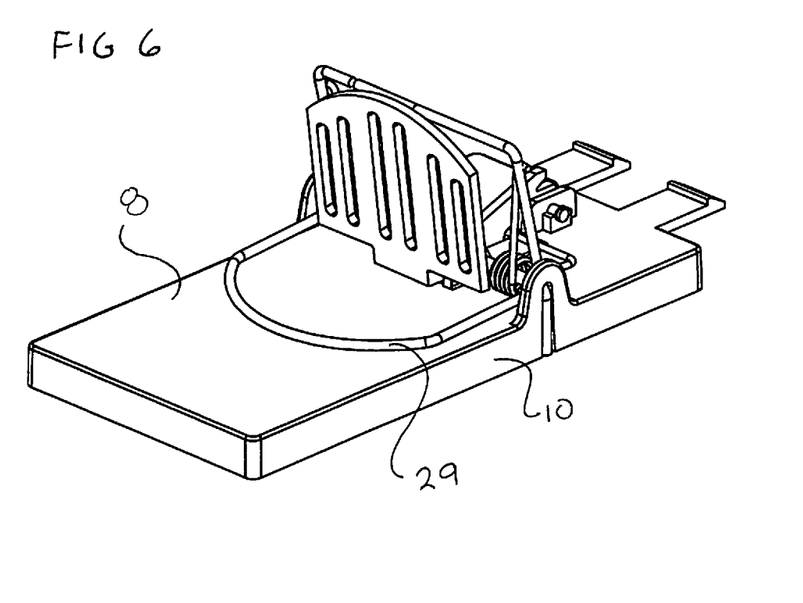
FIG. 6 is a front perspective view of the base snap trap in the tripped mode.
Figure 7:
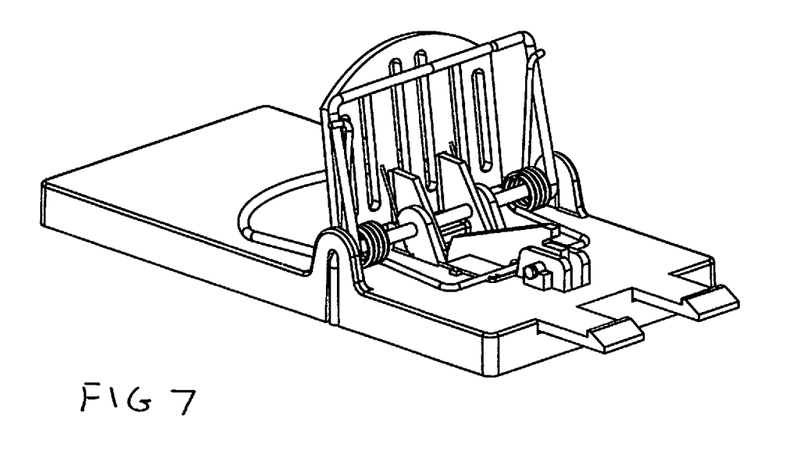
FIG. 7 is a rear perspective view of the base snap trap in the tripped mode.

In operation, the trap 2 is separated into the housing 4 and snap trap 6. At this time the snap arm 29 is actuated (unarmed) and pivoted forward such that it rests on the top face 8 of the trap platform 10 as illustrated in FIGS. 6 and 7. The back end of the trip arm 28 is not in the trip arm recess 30. Bait is positioned on the top face 8 of the platform 10 (well behind the vertical trip plate 22.) The bottom end of the torsion spring 42 is braced against the top face 8 of the trap platform 10 and the two side arms 36 (that extend vertically upward from the torsion spring 26) are connected to the pivotable snap arm 29, exerting forward torsional pressure from the stored energy in the torsion spring (stored energy device) attempting to pivot the snap arm 29 over the vertical trip plate 22 and down onto the top face 8 of the trap platform 10 in the actuation area or chamber 27.

The snap arm 29 is bent at an acute angle and at its bend, resides below and beneath the support member 38. The rear end 41 of the snap arm 29 is locked (under upward torsional force), into the "V" notch 66 of the trip arm 28. The vertical trip plate 22 is tilted such that the front end of the trip arm 28 is inserted into its trip arm recess 30. In this configuration, the upward pull from the wound pressure that the torsion spring 26 transfers from its two side arms 36 onto the snap arm 29, places and upward force on the V notch end of the trip arm 28 that pivotally exerts a downward pressure onto the other end of the trip plate 28 onto the recess 30, maintaining the vertical trip plate 22 in its approximately vertical position and the snap arm 29 poised in its charged position behind the trip plate in the bait chamber. (This is the armed state of the device 2 and the snap arm 29 is positioned as shown in FIGS. 3 and 8.) The snap trap 6 is slid into the housing 4 and reconnected.

When the vermin enters the housing and snap trap, it smells and sees the bait behind the vertical trip plate 22. It approaches the trip plate 22 and rears on its hind legs to investigate or get over the trip plate 22 and places its front legs on the trip plate 22. This forward pressure pushes the top of the pivotable vertical trip plate 22 toward the rear of the trap 2 and the bottom of the vertical trip plate forward as the trip plate 22 pivots about the support member 38. This causes the trip arm recess 30 to move forward enough to allow the rear end of the trip arm 28 to be released and drop down onto the top face 8 of the trap platform 10 thus allowing the trip arm 28 to pivot about its pin 42 such that the front end of the trip arm is tilted upward letting the rear end 41 of the snap arm to be released from the notch 66 in the rear end of the trip arm. There is now no longer anything constraining the forward unwinding pressure from the torsion spring 26 and it is free to pivot or swing forward pushing the connected snap arm 29 at a high rate of speed over the top of the vertical trip plate 22 and down in an arc onto the strike area of the top face 8 of the trap 2 in the actuation chamber. The vermin (on its hind legs) is unable to jump forcefully upward and is further constrained by the housing. Thus it cannot escape and is struck by the rapidly moving snap arm 29. FIGS. 5 and 6 illustrate the trap 2 in both the armed and the actuated modes.

While certain features and aspects have been described with respect to exemplary embodiments, one skilled in the art will recognize that numerous modifications are possible. System components described according to a particular structural architecture and/or with respect to one system may be organized in alternative structural architectures and/or incorporated within other described systems. Hence, the various components and/or features described herein can be substituted, added, and/or subtracted from unless the context dictates otherwise. Consequently, although only one exemplary embodiment is described above, it will be appreciated that the invention is intended to cover all modifications and equivalents within the scope of the following claims.

Having thus described the invention, what is claimed as new and desired to be secured by Letters Patent is as follows:

1. A vermin trap comprising:
   a trap platform,
   a housing engaged to said trap platform;
   a detachable snap trap engageably residing on said trap platform between said housing and said trap platform;
   a vertical, trip plate operationally connected for the actuation of said snap trap.

2. The vermin trap of claim 1 further comprising:
   an enclosed bait chamber; and
   an actuation area;
   wherein said bait chamber is enclosed between said trap platform, said housing and said vertical trip plate, said bait chamber and said actuation area are separated by said vertical trip plate.

3. The vermin trap of claim 2 wherein said vertical trip plate is perforated.

4. The vermin trap of claim 2 wherein said actuation area is partially enclosed between said housing, said trap platform and said trip plate.

5. The vermin trap of claim 1 whereon said vertical trip plate is perforated.

6. The vermin trap of claim 1 wherein said snap trap consists of:
   a means for actuation connected to said vertical trip plate; said means for actuation having a stored energy device operationally connected to a pivotable snap arm that may be propelled at a high rate of speed over said vertical trip plate and into said actuation area.

7. The vermin trap of claim 6 wherein said stored energy device is a torsional spring.

8. The vermin trap of claim 6 further comprising a pivotable trip arm connected between said snap arm and said vertical trip plate.

9. The vermin trap of claim 8 wherein said trip arm has a front end and a rear end, said front end having a notch that engageably releases said snap arm and said rear end releaseably engageable in a recess in said trip plate.

10. The vermin trap of claim 9 wherein said vertical trip plate is pivotable about a support rod that passes through at least one stanchion extending from a back face of said vertical trip plate.

11. The vermin trap of claim 10 wherein upon an application of pressure on a front face of said vertical trip plate, said trip plate pivots to release said rear end of said trip arm which pivots about at least one lug extending from said trip arm that is pivotally connected to said trap platform, said trip arm releasing said snap arm which is releaseably housed in said notch.

* * * * *